United States Patent Office 3,248,540
Patented Apr. 26, 1966

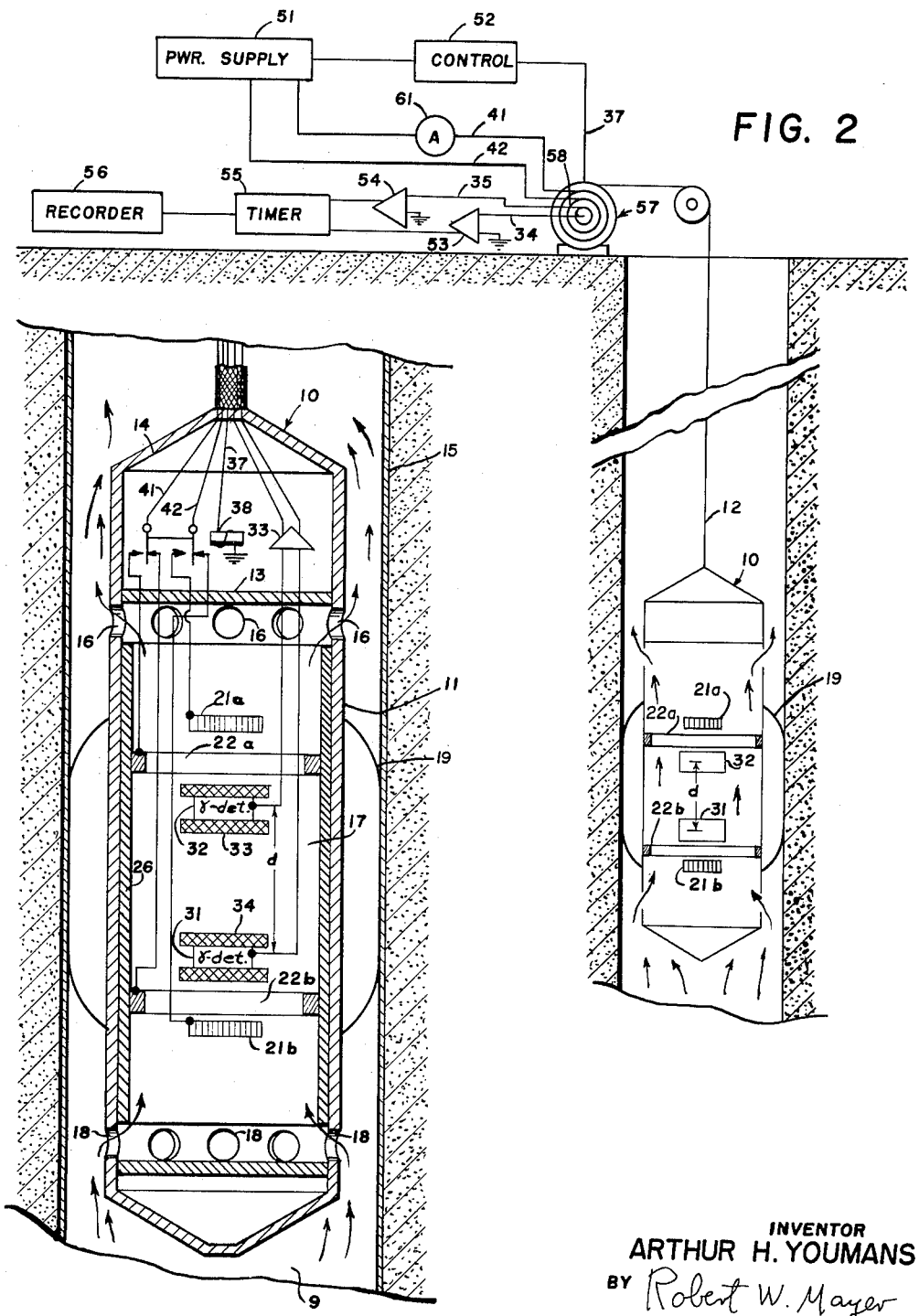

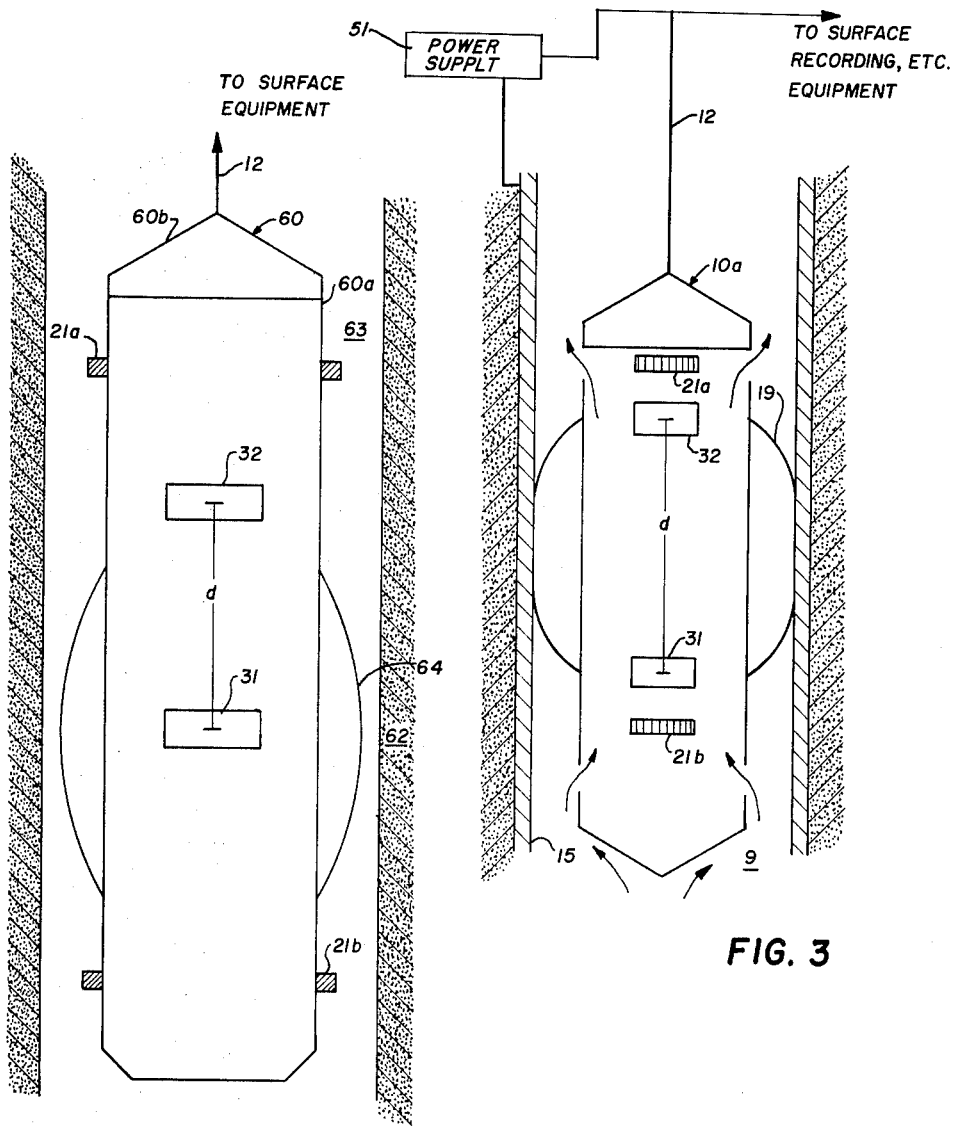

3,248,540
APPARATUS AND METHOD FOR RADIOACTIVE TRACER LOGGING
Arthur H. Youmans, Houston, Tex., assignor, by mesne assignments, to Dresser Industries, Inc., Dallas, Tex., a corporation of Delaware
Filed Mar. 29, 1962, Ser. No. 183,536
9 Claims. (Cl. 250—43.5)

This invention relates to apparatus and method for measuring the velocity of a fluid stream and more particularly to apparatus and method for determining the velocity of fluid circulating in oil wells and the like.

The importance of determining the velocity and direction of fluids flowing in oil wells and other types of conduits has long been recognized. Such determinations are made to ascertain zones of lost circulation, interruptions in borehole integrity and to detect pressure gradients among other reasons.

Radioactive tracer materials have been employed in the past to facilitate the detection of fluid velocity. Usually a liquid containing radioactive material is injected into the borehole fluid and the emitted radiations therefrom are detected at a predetermined distance from the tracer source or at spaced apart points along the borehole.

One problem in prior art radioactivity tracer techniques has been that of accurately metering the tracer fluid. This fluid must be dispensed at a sub-surface location but ideally is controlled at the surface equipment. Also, metering is complicated by the high pressures developed in oil wells at the widely divergent points at which fluid velocities are to be determined. As a result, injections of tracers must normally be at high pressures and this requires a rather complicated dispensing system which is difficult to refill, and difficult to clean and decontaminate of radioactive material. Accurate remote control means must also be provided and the apparatus must be sufficiently rugged to prevent varying borehole pressures from adversely affecting the metering apparatus.

It is an object of this invention, therefore, to provide apparatus for making a measure of the velocity of fluid flow at remote locations, such as within an oil well, which releases a precisely controlled amount of radioactive tracer material in response to manipulation of surface controls.

It is another object to provide relatively simple, safe, inexpensive and rugged sub-surface equipment for injecting precisely determined quantities of tracer material into a fluid stream within an oil well or the like.

It is yet a further object of the invention to provide a highly reliable, accurate and easily controllable method of measuring fluid flow at distant or inaccessible locations such as within an oil well.

In general, these and other objects of this invention are attained by a sub-surface device including a body of ionizable radioactive material and means controllable from a remote point, such as the surface of the earth, for electrochemically injecting a selected quantity of such radioactive material into the fluid stream to be tested in the form of radioactive ions. The number of ions of radioactive material introduced into the stream is a function only of the amount of electric current supplied and the valence of the ions produced. Since the latter factor is known for a given material, it follows that the quantity of radioactive ions released in any given period can be controlled by controlling the ionizing current. This can readily be done in subsurface equipment by means at the surface of the earth.

In accordance with one embodiment of this invention, an electrode of radioactive material is continuously converted to ionic form by electric currents applied at a predetermined rate. A suitable detector positioned a predetermined distance from the electrode and located downstream therefrom continuously measures the intensity of radioactivity emitted from the stream. Variations in the indicated intensity of radioactivity are directly proportional to changes in fluid velocity.

In another embodiment of the invention a given quantity of electric current is supplied to ionize a known quantity of radioactive electrode over a short period of time and the velocity of the resultant "slug" of radioactive material is measured by detecting its presence at various points along the fluid stream.

In the accompanying drawings:
FIG. 1 is a view in section from a portion of an earth well borehole showing flowmeter apparatus embodying certain features of this invention;
FIG. 2 is a schematic illustration of the system utilizing the apparatus shown in FIG. 1 for determining the flow of fluids in a cased borehole;
FIG. 3 is a schematic illustration of a variation of the apparatus shown in FIGS. 1 and 2; and
FIG. 4 is a diagrammatic illustration of apparatus similar to that shown in FIG. 1 but particularly adapted for use within uncased boreholes subject to variations in diameter.

The exemplary embodiment of this invention illustrated in FIG. 1 is arranged for detecting the velocity of fluid flow in a borehole, irrespective of the direction of flow. A well logging tool or section thereof 10 includes a generally cylindrically shaped body 11 supported by a cable 12 for movement through the casing 15 set within the borehole 9. Well fluid, which is electrically conductive by virtue of the presence of a continuous salt water phase, flows within the casing. The upper section of the cylindrical body 11 has a transverse plate 13 which isolates the electronic component compartment 14 from the open part or the interior 17 of cylinder 11 through which the well fluid is directed. A plurality of peripheral apertures or openings 16 are provided in the upper part of the cylindrical body 11 immediately adjacent the isolating plate 13 to provide fluid communication between the borehole 9 and the interior 17 of cylindrical body 11. The interior 17 is open between the fluid communicating sets of apertures 16 and 18 so that fluid can flow through one set of apertures for example, 16, down through the length of the cylindrical body 11 and out of the lower apertures 18, or vice versa. An expandible, flexible sleeve 19, surrounding the mid portion of the tool, engages the casing 15 and substantially prohibits the flow of fluid in the annular space between the tool 10 and the casing so that fluids are forced to flow within the body 11. Such sleeves and means for expanding and contracting them are well known in the well logging art. A suitable arrangement is disclosed in U.S. Patent 2,935,615, issued May 3, 1960. Since means for expanding and contracting sleeve 19 are well known and since they form no part of this invention they are not illustrated or further described.

Symmetrically supported in the upper and lower end (with respect to the orientation of FIG. 1) of the interior 17 are radioactive anodes 21a and 21b. In accordance with a preferred embodiment of this invention anodes 21a and 21b are composed of metallic zinc containing the radioactive isotope $Zn^{65}$ in a known uniform concentration such as to provide a predetermined radioactivity per unit weight in the range of 1 to 100 millicuries per gram. The anodes 21 cooperate with concentric cathodes 22 that are primarily composed of a metal that preferably is below zinc in the electromotive series, iron, for example. Typically, cathodes 22 are made of steel. The preferred embodiment of the invention includes cathode means that are more electronegative than the anode means in order to prevent any plating of radioactive anode material on a metal part within the well. Since the process is carried on in the presence of a flowing liquid, however, the chances any plating will occur is quite minimal. Therefore, the invention may be practiced with anode and cathode means bearing any relation to one another in the electromotive series. If desired, anode and cathode may have the same chemical composition with the anode, containing, of course, the radioactive isotope. Cathode 22a is supported below and outwardly from its cooperating anode 21a; similarly, cathode 22b is supported above and outwardly from its cooperating anode 21b. A cylindrical lead shield 26 encircles the cathodes 22a and 22b to shield the formation surrounding the borehole from gamma rays emitted by the radioactive anodes and the flowmeter from any radioactive materials in the formations or the borehole.

A pair of gamma ray detectors 31 and 32, supported along the center part of the cylindical body 11, are spaced at a predetermined distance "d" apart. Lead shields 33 and 34 surround the detectors to shield them from spurious radiations. The gamma ray detectors 31 and 32 may be one of a number of available types, for example, ionization chambers, Geiger-Mueller or scintillation counters. For certain applications of the invention it is only necessary that they detect the presence of radioactive ions and not that they be capable of distinguishing between different levels of radiant energy. For those forms of the invention requiring such discrimination, some type of scintillation counter is preferred as detector. A Geiger-Mueller counter used in the embodiment of the invention particularly described provides a signal proportional to the number of radioactive ions detected.

As shown in FIG. 2, conductor 37 is electrically connected to the surface equipment, including power supply 51, connecting it to control relay 38 within the upper portion of the tool. Relay 38 functions when energized to connect the current conductors 41 and 42 to the anode-cathode pair 21a–22a or, when de-energized, to anode-cathode pair 21b–22b. The connection which the operator chooses depends upon the direction of fluid flow in the borehole. In the exemplary embodiment described and with fluid assumed to be flowing upward along the borehole, relay 38 is in a released condition and conductors 41 and 42 are connected to lower anode-cathode pair 21b–22b. When the flow of fluids is downward through the borehole 9, relay 38 is operated to transfer current through conductors 41 and 42 over back contacts of the relay 38 to anode-cathode pair 21a–22a.

The surface equipment operating the tool 10 illustrated in FIG. 2 includes power supply 51, control panel 52, circuits 53 and 54, each of which are made up of conventional amplifier and ratemeter means suitable for converting a signal from the tool 10 to one suitable for recording on conventional strip chart recorders, a timer 55, and a recorder 56. The logging tool 10 is shown as supported by cable 12 which includes conductors 34, 35, 37, 41 and 42, which electrically connect the surface equipment to subsurface components. A plurality of slip rings 58 associated with cable takeup reel 57 transfer current to their cooperating surface components by way of the identified conductors.

The operation of the apparatus illustrated in FIGS. 1 and 2 is as follows:

Controls on panel 52 permit the establishment of a predetermined current flow from power supply 51 as measured by ammeter 61 through conductors 41 and 42 to the anode-cathode combination 21b–22b. The appropriate anode-cathode combination is selected in accordance with the direction of flow by means of a control signal operating control relay 38. With the direction of fluid flow along the borehole from the lower part of the borehole 9 upward toward the surface (as illustrated by the arrows in FIGS. 1 and 2) and with the apparatus stationary, the well fluid enters the interior 17 of the logging tool 10 through apertures 18, flows past the zinc anode 21b and the steel cathode 22b, gamma ray detectors 31 and 32 (in that order) and thereafter out of the apertures 16. If a current of a preselected quantity is caused to flow between the anode 21b and the cathode 22b, a known quantity of zinc will be converted to positive ions in solution per unit of time. These ions are detected sequentially by the gamma ray detectors 31 and 32 and the output signals therefrom are transmitted to the surface equipment. There, the calibrated distance and time lapse between the enablement of the two detectors are combined to find a signal substantially related to the velocity of the fluid.

The amount of zinc converted to positive ions in solution can be accurately controlled by controlling the current from power supply 51. This follows from Faraday's first law of electrolysis which states that the amount of chemical decomposition produced by a current, that is, the amount of any substance deposited or dissolved, is proportional to the quantity of electricity passed. The quantity of electricity in coulombs is equal to the product of the current in amperes and the time in seconds during which it flows. Thus, if 100 amperes is measured by ammeter 61 as flowing between the zinc anode and the steel cathode, the total mass of zinc dissolved will be $33.5 \times 10^{-5}$ grams per second. By conventional timing means (not shown) the power supply 51 may be connected to the tool for a controlled period, for example 1 second, to provide a "slug" of zinc ions in the amount of $33.5 \times 10^{-5}$ grams. This "slug" has an amount of radioactivity dependent on the concentration of $Zn^{65}$ in the zinc anode. If the anode has 10 millicuries of $Zn^{65}$ per gram of zinc then the radioactivity of the "slug" will be 3.35 microcuries, an amount readily detectable by the gamma ray detectors 31 and 32. A smaller or larger number of coulombs of electricity will produce a proportionally smaller or larger concentration of radio tracer in the fluid.

As the "slug" of radioactive zinc ions is detected sequentially by gamma ray detectors 31 and 32, the resultant signals are amplified by subsurface amplifiers 33 and directed by way of conductors 34 and 35 and ground to the input of circuits 53 and 54. Circuits 53 and 54 contain both the amplifiers and the ratemeters required by the respective detector signal channels and are connected to the input of the timer or velocity converter 55. Timer 55 divides the calibrated distance ("d" on FIG. 1) by the time lapse between the presence of the signals at the outputs of circuits 53 and 54 to provide a signal substantially related to the fluid velocity. This is recorded by recorder 56 in correlation with the known location of the logging tool 10 within the borehole. Alternatively, the outputs of circuits 53 and 54 may each be recorded directly as a function of time and the fluid velocity computed from such records.

It can be appreciated from the foregoing description that the invention provides a straightforward and sensitive system for injecting radioactively tagged elements into the borehole fluid, for detecting them at selected spaced apart points, and for deriving a signal substantially related to the fluid velocity therefrom. By controlling the amount of current flowing through the anode-cathode combination selected, it is possible to increase or decrease the quantity of radioactive particles dispersed. This permits the concentration of radioactive particles dispersed to be varied as required by the conditions prevailing at any given point in the borehole. Thus, the radioactive tracer concentration can be increased whenever necessary to override interfering radioactive sources in the vicinity of the borehole. Also, for best results, when measuring a wide range of fluid velocities over the length of a single borehole, the quantity of tracer can be increased where velocities are great and decreased where velocities are low to give optimum results.

By arranging the detectors to be substantially insensitive to gamma rays of those levels corresponding to natural gamma rays but sensitive to the radiations from the tagged particles, as can be done with a scintillation counter by means well known to the art, it is possible to reduce the relative amount of tracer material, thereby reducing the cost and the hazard associated with the operation.

FIG. 3 illustrates a different form of the invention in a schematic and very diagrammatic form. The tool 10a shown suspended by cable 12 in borehole 9 is substantially identical with the tool 10 shown in FIGS. 1 and 2 except the cathodes 22a and 22b have been eliminated. Instead tool 10a cooperates with a single cathode in the form of well casing 15. The power supply 51 is shown schematically as connected between the conductor-carrying cable 12 and the casing 15 so that a current may flow from the power supply through the casing 15 as cathode, through the conductive well fluid as electrolyte and from each of the zinc bodies 21 as anodes. Either anode 21a or 21b is connected to the power supply depending on the direction of flow of well fluid as explained in connection with the description of the embodiment of the invention shown in FIGS. 1 and 2. It will be appreciated that the presence of the well casing is not essential to the operation of this embodiment. In the absence of casing, the earth itself may serve as the path for the flow of current and the borehole wall may be regarded as the cathode.

Operation of the embodiment of FIG. 3 is the same as that of the embodiment previously described in that the radioactive zinc may be ionized in discrete slugs by providing short pulses of a known amount of current which flows between one of the anodes 21 and the borehole wall or the casing 15; or ionization of the radioactive zinc may be effected continuously at a uniform rate. In the latter case, the observed counting rate at a detector anywhere downstream of the dissolving anode will be inversely proportional to the flow rate. To measure fluid flow velocity by this technique, the detector signal is transmitted to the surface and after passing through a conventional amplifier and ratemeter, is recorded as a function of the depth of the tool in the borehole.

FIG. 4 is a diagrammatic illustration of a tool 60 generally similar to the tool 10 but particularly adapted to the measurement of fluid flow past the exterior of the tool. Tool 60 comprises a hollow, fluid-tight generally cylindrical housing 60a within which detectors 31 and 32 are positioned. Electronic components of the kind contained in compartment 14 of tool 10 are positioned within compartment 60b of tool 60. Radioactive anodes 21a and 21b have the form of circumferential rings suitably mounted on the exterior of housing 60a and appropriately electrically insulated therefrom by means not shown. In this embodiment of the invention, the ground 62 serves as cathode in the circuit including anodes 21a and 21b. The tool 60 carries on its exterior an inflatable sleeve 64 (similar in structure and means of activation to sleeve 19) or other suitable means which restricts the flow of fluid between it and the sidewall of the borehole 63.

FIG. 4 shows the tool 60 in an uncased hole wherein tools of this type find important applications. Detector 31 is so positioned in the tool 60 that it is surrounded by the sleeve 64 while detector 32 is not. The linear velocity of the fluid passing detector 31 will not be the same as that passing by detector 32 even when the volumetric flow rate is the same in both cases. However, if the borehole is constant in diameter and no fluid enters the borehole between the two detectors, then the counting rates of the two respective detectors will have a constant ratio; thus by comparing the two measurements, variations in the borehole diameter will be observed to cause a variation in this ratio. As previously explained, the observed counting rate at the respective detectors is proportional to the concentration of radio tracer in the fluid, and inversely proportional to its linear flow rate past the detector. In the present case, the concentration may be the same at both detectors, but the linear flow rates differ due to the differing tool diameters at the respective detectors and due to variations in borehole diameter, if any.

To derive from the measurement both the volumetric flow rate and the borehole diameter, empirical calibration curves may be employed. It is relatively simple, however, to calculate these values based on the following considerations:

Assume that a borehole of cross-sectional area A square feet with the cross-sectional area of the tool 60 adjacent the detector 31, that is, the area including that occupied by a cross-section of sleeve 64, is $A_1$ square feet and the cross-sectional area of the logging tool at the detector 32 is $A_2$ square feet.

If the volumetric flow rate of fluid past the subsurface tool 60 is V cubic feet per minute, the linear speed of fluid is $S_1$ feet per minute at detector 31 and $S_2$ feet per minute at detector 32 then (1) $$S_1 = \frac{V}{A - A_1}$$

and (2) $$S_2 = \frac{V}{A - A_2}$$

$A_1$ and $A_2$ being dimensions of the tool are always known exactly and A is known exactly where casing has been set in borehole 63 or where the borehole diameter is otherwise known.

Where $R_1$ and $R_2$ are the counting rates corrected for background (if any) of detectors 31 and 32 it is obvious that (3) $$\frac{S_1}{S_2} = \frac{R_2}{R_1}$$

Thus the ratio of counting rates at the detectors 31 and 32 will always be constant with radioactive ions being deposited in the fluid stream at a predetermined, constant rate unless the borehole diameter is different from that used in the normalization procedure, or unless the fluid volumetric flow rate is different at one detector than at the other. Accordingly, in operation, the outputs from detectors 31 and 32 may be normalized to give equal deflections at one or more points in a borehole of known diameter. This having been done, the two deflections will, in general, be everywhere the same except where the borehole diameter is different. If fluid leaves the borehole between the two detectors, no effect on the relative counting rate will be observed, even though the fluid flow velocity is thereby changed, since this does not alter the concentration of radioactive tracer in the fluid. If, however, fluid enters the borehole, the concentration of radioactive tracer at the detector along the direction of flow, such as detector 32, will be reduced by dilution. Thus, the counting rate at the detector 32 will be reduced while that at 31 was unchanged. Therefore, when surveying wells where fluid enters the borehole, this fact may be observed and the point of entry accurately located.

The sleeve 64 may be any material effecting a streamlined enlargement of the housing at the desired point. If the sleeve 64 is a suitably constructed annulus which may be increased and decreased in size by control from the surface, as by a hydraulic pump which moves borehole fluid in or out of the sleeve, then detector 32 can be eliminated. In such case, both measurements are made with detector 31: first a measurement is made with the sleeve deflated; and then a measurement is made with the sleeve inflated. The two measurements are then analogous to the measurements previously described as being made by separate detectors 31 and 32.

The operation of the tool 60 is the same as that of tools 10 and 10a; that is, the tracer may be released in discrete slugs by providing short pulses of a known amount of current or deposition of the zinc or other radioactive metal may be effected continuously at a uniform rate and a detector positioned along the direction of flow to observe the equilibrium intensity of the fluid radioactivity then the observed counting rate at a detector anywhere along the instrument in the direction of flow will be inversely proportional to the flow rate. This counting rate signal may then be recorded as a function of depth in the well, and empirically calibrated in terms of fluid flow rate for each borehole diameter to be surveyed.

Although the several embodiments of the invention have been described as employing a radioactive zinc anode and iron cathode, it would be apparent that other suitable anode-cathode combinations may be employed wherein a radioactive metal having a suitable half-life serves as anode. Suitable radioactive isotopes other than $Zn^{65}$, include $Cd^{115}$, and $Co^{60}$ and $Cu^{64}$. Since each of these metals is below iron in the electromotive series, it preferably is used in conjunction with a more electronegative cathode, such as mercury. However, it will be appreciated that in the embodiments described, the ions released from the anode tend to be swept away with the flowing fluids and do not accumulate at the cathode regardless of the material of which it is constructed. Accordingly, it is feasible to operate with any convenient cathode material, although the preferred cathode materials are those lower in the electromotive series than the anode material. Thus, any suitable radioactive metals may be used as anode, or certain non-metals may be employed for the same purpose but with reversed polarity to effect the electrolytic dissociation of the tracer bearing material.

While this invention has been described particularly with respect to specific electrode and electrical current arrangements, it will be apparent that other arrangements are possible without departing from the spirit and scope of the invention. The basic inventive concept involves the utilization of a solid radioactive material that is electrochemically deposited in a well fluid to provide tagged elements for detection downstream thereof. The invention eliminates the need for pressurizing the system and also permits accurate and effective control of the radioactivity intensity of the tagged elements through control of the rate of conversion of the electrodes to ionic form. Other variations of the components of the basic system will be apparent to those skilled in the arts; and for this reason the invention should only be limited to the extent of the appended claims.

I claim:

1. Apparatus for determining the velocity of flow of a conductive fluid stream comprising:
   a body of ionizable radioactive material supported in the fluid stream;
   means for electrochemically ionizing said material to deposit a predetermined quantity of radioactive ions in said fluid stream; and
   means positioned in said stream downstream of said body a predetermined fixed distance for detecting the presence of said radioactive ions in said fluid stream and producing a signal indicative of said detection.

2. Apparatus for determining the velocity of flow of a conductive fluid stream comprising:
   a body of ionizable radioactive material supported in the fluid stream;
   means for electrochemically ionizing said material to deposit fixed predetermined quantities of radioactive ions in said fluid stream;
   means positioned downstream of said body a fixed predetermined distance therefrom for detecting the presence of radioactive ions and producing a first signal indicative of such detection; and
   means for deriving a second signal substantially related to the velocity of flow of said fluid stream from said predetermined distance and said first signal.

3. Apparatus for determining the velocity of flow of a fluid comprising:
   an anode containing a radioactive metal suspended in the fluid stream;
   a cathode suspended in the fluid stream and composed of metal more electronegative than said radioactive metal;
   a source of electric current;
   means operable to connect said source to said anode and said cathode to produce ions of said radioactive metal in the fluid stream;
   radiation detection means positioned downstream a fixed distance from said anode to detect movement of said radioactive ions over said distance;
   means responsive to said radiation detection means to provide a first signal proportional to the time interval required for movement of said radioactive ions over said distance; and
   means responsive to said first signal to provide a second signal which is a function of the velocity of said fluid stream.

4. Apparatus according to claim 3 wherein said radiation detection means comprise two radiation detectors spaced apart by said calibrated distance.

5. Apparatus according to claim 3 wherein said radioactive metal is $Zn^{65}$.

6. Apparatus for determining the velocity of flow of a conductive fluid stream within a metallic conduit, said apparatus comprising:
   an anode containing a radioactive metal more electropositive than iron suspended in the fluid stream;
   a souce of electric current;
   means operable to connect said source to said anode and to the conduit whereby said conduit serves as a cathode in an electrochemical system for producing ions of said radioactive metal in said fluid stream;
   radiation detection means positioned a fixed distance downstream of said anode to detect movement of said radioactive ions over a calibrated distance;
   means responsive to said radiation detection means to provide a first signal proportional to the time interval required for movement of said radioactive ions over said calibrated distance; and
   means responsive to said first signal to provide a second signal which is a function of the velocity of said fluid stream.

7. Apparatus for detecting points of fluid entry into a well bore, said apparatus comprising:
   an elongated, hollow cylindrical body;
   means for supporting said cylindrical body at predetermined depths within the well bore;
   means, within said body, for electrolytically producing a predetermined number of radioactive ions in the fluid within the well bore;
   means forming a fluid tight chamber within said cylindrical body;
   first radiation detection means positioned within said chamber;
   second radiation detection means positioned within said chamber and longitudinally spaced a predetermined distance from said first detection means;
   fluid flow deflection means carried on the exterior of said cylindrical body at a longitudinal position adjacent said first detection means, said deflection means effective to increase the cross-sectional area of said body at said longitudinal position with respect to the cross sectional area of said body at the longitudinal position adjacent said second detection means; and
   means for making a measure of the radiation detected by said detection means in correlation with the position of said cylindrical body in said well bore.

8. A method of making a measure of the velocity of flow of a stream of conductive fluid, said method comprising the steps of:
   electrolytically producing a predetermined number of radioactive ions in the fluid stream in a predetermined time period;
   detecting the presence of said radioactive ions at a first predetermined location in the fluid stream; and
   detecting the presence of said radioactive ions at a second predetermined location in the fluid stream a calibrated distance downstream of said first predetermined location.

9. A method of making a measure of the velocity of flow of a stream of conductive fluid, said method comprising the steps of:

electrolytically producing radioactive ions at a predetermined constant rate in the fluid stream;

detecting the presence of said radioactive ions at a first predetermined location in the fluid stream; and detecting the presence of said radioactive ions at a second predetermined location in the fluid stream a calibrated distance downstream of said first predetermined location.

References Cited by the Examiner

UNITED STATES PATENTS

| | | | |
|---|---|---|---|
| 2,617,941 | 11/1952 | Craggs | 250—106 X |
| 2,659,046 | 11/1953 | Arps | 250—106 X |
| 2,965,753 | 12/1960 | Reynolds et al. | 250—43.5 |
| 3,116,419 | 12/1963 | Martin | 250—43.5 X |

RALPH G. NILSON, *Primary Examiner.*

ARCHIE BORCHELT, *Examiner.*